United States Patent [19]

Lacroix

[11] 4,336,026
[45] Jun. 22, 1982

[54] LIQUID PREPARATION OF AN ANIONIC DYE OF THE DISAZO CLASS

[75] Inventor: Roger Lacroix, Village-Neuf, France

[73] Assignee: Ciba-Geigy Corporation, Ardsley, N.Y.

[21] Appl. No.: 226,573

[22] Filed: Jan. 19, 1981

[30] Foreign Application Priority Data

Feb. 5, 1980 [CH] Switzerland .......................... 915/80

[51] Int. Cl.³ ............................................. D06P 67/00
[52] U.S. Cl. ............................................. 8/527; 8/585;
8/604; 8/609; 8/681; 8/687; 8/918; 8/919; 8/924
[58] Field of Search .................... 8/527, 585, 681, 604

[56] References Cited

U.S. PATENT DOCUMENTS 4,163,012  7/1979  Kramer et al. ..................... 260/182
4,179,267 12/1979  Lacroix et al. ........................ 8/585

FOREIGN PATENT DOCUMENTS 631379  4/1963  Belgium .
2115877 10/1972  Fed. Rep. of Germany .
7204084 10/1972  Netherlands .
1418794 12/1975  United Kingdom .

Primary Examiner—A. Lionel Clingman
Attorney, Agent, or Firm—Edward McC. Roberts

[57] ABSTRACT

A liquid preparation of an anionic dye of the disazo class, which preparation contains the disazo dye, which in the form of the free acid corresponds to the formula

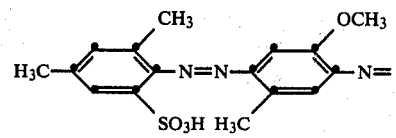

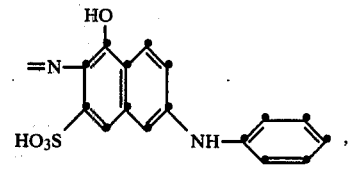

dissolved in a solvent mixture which is miscible with water in any proportion and which consists of N,N,N',N'-tetramethylurea, at least one alkylene glycol ether and water, and alkyl- or alkanolamine in an amount sufficient to bring the pH value of the liquid preparation to 6.5 to 8.5, the dye being in the form of alkyl- or alkanolamine. This novel liquid preparation is a concentrated true solution which is stable in storage over several months at temperatures of between about −10° C. and +60° C., and which is miscible with cold and warm water in any proportion. It is suitable in particular for dyeing and printing paper, including semi-cardboard and cardboard, the dyeing of these materials being possible, for example, in the pulp, or by brushing or immersion.

10 Claims, No Drawings

LIQUID PREPARATION OF AN ANIONIC DYE OF THE DISAZO CLASS

The invention relates to a novel liquid preparation of an anionic dye of the disazo class, to a process for producing it, and to the use thereof for dyeing cellulose materials and in particular paper.

Liquid preparations of anionic dyes are known for example from the German Offenlegungsschrift No. 2,335,512. This Offenlegungsschrift claims dye solutions which contain azo, nitro or anthraquinone dyes containing sulfonic acid groups, dissolved in a solvent mixture which is miscible with water in any proportion, and which consists of an aprotic solvent or a mixture of aprotic solvents, a glycol or glycol ether, and optionally water.

When however the dye of the formula

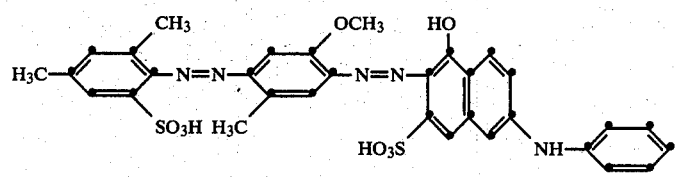

in the form of an alkali salt, as obtained on producing the dye by customary processes, is used in a solvent mixture according to the Offenlegungsschrift mentioned above, a storage-stable solution is not obtained.

It has now been found that surprisingly a true storage-stable solution is obtained by using the stated dye in the form of an amine salt in a specific solvent mixture.

The preparation according to the invention contains the disazo dye, which in the form of the free acid corresponds to the formula

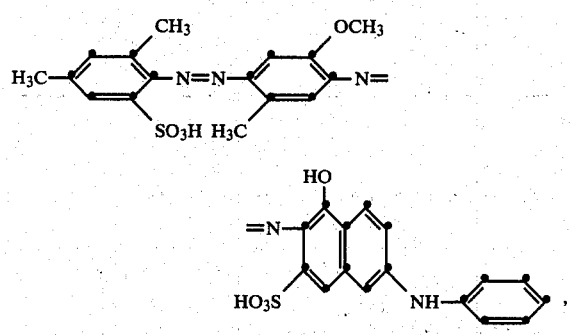

dissolved in a solvent mixture which is miscible with water in any proportion and which consists of N,N,N',N'-tetramethylurea, at least one alkylene glycol ether and water, and alkyl- or alkanolamine in an amount sufficient to bring the pH value of the liquid preparation to 6.5 to 8.5, the azo dye being in the form of the alkyl- or alkanolamine salt.

The liquid preparation according to the invention contains the dye preferably in amounts of 10 to 30, particularly 15 to 20, percent by weight, the dye weight being calculated on the basis of the dye as free acid. The applicable solvent mixture is composed advantageously of 3 to 20, especially 5 to 8, percent by weight of tetramethylurea, 25 to 45, especially 30 to 40, percent by weight of an alkylene glycol ether, and 20 to 40, preferably 20 to 35, percent by weight of water, relative to the total preparation. This preparation also contains an alkyl- or alkanolamine in an amount sufficient to bring the pH value of the preparation to about 7 to 8, the dye being present as alkyl- or alkanolamine salt. The preparation can optionally contain further additives in small amounts. Alkylene glycol ethers usable according to the invention are for example: ethylene glycol monomethyl ether and ethylene glycol monoethyl ether, diethylene glycol monomethyl ether, diethylene glycol monobutyl ether, triethylene glycol monobutyl ether and preferably diethylene glycol monoethyl ether, or mixtures of these glycol ethers with each other.

Alkylamines suitable for adjusting the pH value are for example: alkylamines having 1 to 6 carbon atoms, such as methylamine and ethylamine; suitable alkanolamines are for example: ethanolamine, n-propanolamine, i-propanolamine, diethanolamine, triethanolamine and triisopropanolamine. The liquid preparation according to the invention preferably contains about 3 to 10 percent by weight, particularly 3 to 6 percent by weight, of the alkyl- or alkanolamine, especially triisopropanolamine.

This liquid preparation can contain further additives, such as electrolyte (for example NaCl or $Na_2SO_4$), urea, pentaerythritol, dispersing agents, bacteriostatics, antifoaming agents, and so forth. It can contain up to about 3 percent by weight, preferably however at most 1.5 percent by weight, of these further additives.

This novel liquid preparation is a true solution. It has a high content of dye, has a viscosity of about 25 cPs/20° C., is stable in storage over several months at temperatures between about $-10°$ C. and $+60°$ C., and is miscible in any proportion with cold and warm water.

The liquid preparation according to the invention can be produced directly from the dye press cake which contains the dye in the form of the free acid, the process comprising for example adding the defined disazo dye as free acid, either in the form of pure material or preferably in the form of aqueous press cake, at room temperature to a solvent mixture as defined, consisting of at least one alkylene glycol ether and tetramethylurea, optionally in admixture with water, and immediately afterwards adding the alkylamine or alkanolamine in an amount sufficient to bring the pH value of the resulting solution to about 6.5 to 8.5, preferably 7 to 8. In the case where an aqueous press cake is used, it is not necessary to add water separately.

The liquid preparation according to the invention is used, optionally after dilution with water, in particular for dyeing and printing paper, including semi-cardboard and cardboard, the dyeing of these materials being possible, for example, in the pulp, or by brushing or immersion. In addition, a liquid preparation of this type can be used in a continuous or discontinuous dyeing process for textile materials, particularly cellulose and polyamide.

The Examples which follow further illustrate the invention "SR" denotes "Schopper Riegler", and, except where otherwise stated, % values are by weight.

EXAMPLE 1

540 g of the aqueous press cake, containing about 10 g of NaCl, 340 g of water and 190 g of the dye of the formula

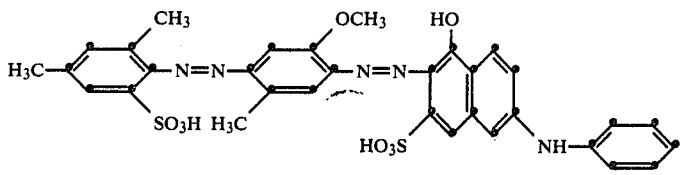

in the form of the free acid is mixed with vigorous stirring, at room temperature, with 50 g of tetramethylurea and 370 g of diethylene glycol monoethyl ether. Immediately afterwards the pH value of the mixture is adjusted with about 40 g of triisopropanolamine to 7 to 8, and the resulting solution is stirred at room temperature for about a further 5 hours. There is obtained a true dye solution which has a viscosity of about 25 cPs at 20° C., and which consists of 23% of the above-mentioned dye as triisopropanolamine salt (comprising 19% of free dye acid and 4% of triisopropanolamine), 34% of water, 1% of NaCl, 37% of diethylene glycol monoethyl ether and 5% of tetramethylurea. This dye solution is stable during several months at temperatures of −10° C. to +60° C., and is miscible with water in any proportion. After dilution with water, the dye is suitable for dyeing paper.

The procedure of the above Example 1 is repeated, except that the components indicated in Examples 2 to 5 below are used. Dye solutions are obtained which have the composition indicated in these examples and have similar properties.

EXAMPLE 2

Amounts of the components employed:

540 g of the aqueous press cake indicated in Example 1,
50 g of tetramethylurea,
390 g of diethyleneglycolmonoethylether,
ca. 20 g of ethylamine.

Composition of the concentrated dye solution:

19 percent by weight of dye (calculated as the free acid),
ca. 2 percent by weight of ethylamine,
1 percent by weight of NaCl,
34 percent by weight of water,
5 percent by weight of tetramethylurea,
39 percent by weight of diethyleneglycolmonoethylether.

EXAMPLE 3

Amounts of the components employed:

540 g of the aqueous press cake indicated in Example 1,
50 g of tetramethylurea,
385 g of diethyleneglycolmonobutylether,
25 g of ethanolamine.

Composition of the concentrated dye solution:

19 percent by weight of dye (calculated as the free acid),
2.5 percent by weight of ethanolamine,
1 percent by weight of NaCl,
34 percent by weight of water,
5 percent by weight of tetramethylurea,
38.5 percent by weight of diethyleneglycolmonobutylether.

EXAMPLE 4

Amounts of the components employed:

540 g of the aqueous press cake indicated in Example 1,
50 g of tetramethylurea,
385 g of diethyleneglycolmonomethylether,
25 g of ethanolamine.

Composition of the concentrated dye solution:

19 percent by weight of dye (calculated as the free acid),
2.5 percent by weight of ethanolamine,
1 percent by weight of NaCl,
34 percent by weight of water,
5 percent by weight of tetramethylurea,
38.5 percent by weight of diethyleneglycolmonomethylether.

19 percent by weight of dye (calculated as the free acid),
2.5 percent by weight of ethanolamine,
1 percent by weight of NaCl,
34 percent by weight of water,
5 percent by weight of tetramethylurea,
38.5 percent by weight of diethyleneglycolmonobutylether.

EXAMPLE 5

Amounts of the components employed:

540 g of the aqueous press cake indicated in Example 1,
50 g of tetramethylurea,
375 g of diethyleneglycolmonoethylether,
35 g of isopropanolamine.

Composition of the concentrated dye solution:

19 percent by weight of dye (calculated as the free acid),
3.5 percent by weight of isopropanolamine,
1 percent by weight of NaCl,
34 percent by weight of water,
5 percent by weight of tetramethylurea,
37.5 percent by weight of diethyleneglycolmonoethylether.

EXAMPLE 6

Printing paper 800 g of bleached sulfate cellulose and 200 g of bleached sulfite cellulose are placed in the supplied form into a pulper containing 14 cubic meters of industrial water, and beaten up until free from specks. The beating up operation requires 30 minutes. The beaten-up cellulose is then transferred to a discharge vat. From this vat the cellulose suspension is ground by means of pulp mills to a degree of fineness of 25° SR, and is subsequently fed into a mixing vat. There are then added to the pulp in the mixing vat 250 kg of kaolin Ia (as filler) and 0.1 to 0.05% of the dye preparation according to Example 1, based on the weight of absolutely dry fibre. After 15 minutes' absorption time, there are added 2% of resin glue, based on the weight of absolutely dry cellulose, and, after 10 minutes, 4% of alum, based on the weight of absolutely dry cellulose. In the normal course of the process, this paper pulp is then fed to the paper machine, and from this is obtained a printing paper dyed in a violet shade.

EXAMPLE 7

Tissue paper 1000 kg of bleached sulfate cellulose in the supplied form is placed into a pulper containing 14 cubic meters of industrial water, and beaten up until free from specks, an operation requiring 30 minutes. The beaten-up cellulose is subsequently transferred to a discharge vat, and from this vat it is ground by means of pulp mills to a degree of fineness of 25° SR, and is then fed into a mixing vat. An addition is made in the mixing vat of 0.1 to 0.05% of the dye preparation according to Example 1, relative to the weight of absolutely dry fibre. After 15 minutes' absorption time, this paper pulp passes in the normal course of the process to the paper machine, from which is obtained a tissue paper dyed in a violet shade.

EXAMPLE 8

Sizing press application 5 kg of dye in the form of a solvent-containing preparation according to Example 1 is dissolved in 1000 liters of a 10% aqueous anionic starch solution (soluble starch which is oxidatively hydrolysed), and the solution is applied by way of a sizing press to a paper web. The applied amount of the above solution is 1.5 g/m² of absolutely dry paper per side. There is obtained a paper dyed in a violet shade.

What is claimed is:

1. A stable and concentrated liquid preparation of an anionic dye of the disazo class, which preparation is miscible with water in any proportion and contains the disazo dye, which in the form of the free acid corresponds to the formula

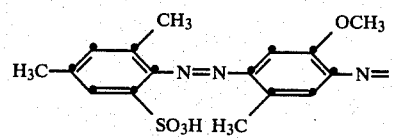

-continued

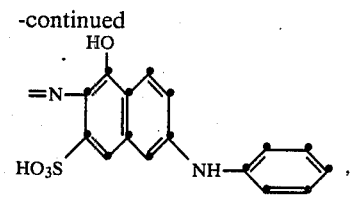

dissolved in a solvent mixture which is miscible with water in any proportion and which consists of N,N,N',N'-tetramethylurea, at least one alkylene glycol ether and water, and alkyl- or alkanolamine in an amount sufficient to bring the pH value of the liquid preparation to 6.5 to 8.5, the dye being in the form of the alkyl- or alkanolamine salt.

2. A liquid preparation according to claim 1, which consists of 10 to 30, percent by weight of the disazo dye, calculated as free acid, dissolved in 20 to 40, percent by weight of water, 3 to 20, percent by weight of tetramethylurea, 25 to 45, percent by weight of an alkylene glycol ether, and alkanolamine or alkylamine in an amount sufficient to bring the pH value of the solution to 6.5 to 8.5, and optionally further additives.

3. A liquid preparation according to claim 1, which contains the disazo dye in the form of the triisopropanolamine salt.

4. A liquid preparation according to claim 1, which contains as alkylene glycol ether: ethylene glycol monomethyl ether, ethylene glycol monoethyl ether, diethylene glycol monomethyl ether, diethylene glycol monoethyl ether, diethylene glycol monobutyl ether or triethylene glycol monobutyl ether, or a mixture of these glycol ethers.

5. A liquid preparation according to claim 1, which contains diethylene glycol monoethyl ether.

6. A liquid preparation according to claim 1, which contains as further additives: electrolyte, bacteriostatics and/or anti-foaming agents.

7. A process for producing the liquid preparation according to claim 1, which process comprises adding the disazo dye as free acid in the form of the aqueous press cake, at room temperature, to a solvent mixture as defined, the solvent mixture consisting of at least one alkylene glycol ether and tetramethylurea, optionally in admixture with water, and immediately afterwards adding the alkyl- or alkanolamine in an amount sufficient to bring the pH value of the resulting solution to about 6.5 to 8.5.

8. The liquid preparation of claim 2, wherein the disazo dye content is 15 to 20% by weight, the water content is 20 to 35% by weight, the tetramethylurea content is 5 to 8% by weight and the alkylene glycolether content is 30 to 40% weight.

9. A process of dying or printing a cellulose substrate or a polyamide substrate, comprising the step of applying the liquid preparation of claim 1 to the substrate.

10. The process of claim 10, wherein the substrate is paper.

* * * * *